(12) United States Patent
Burton et al.

(10) Patent No.: US 10,807,875 B2
(45) Date of Patent: Oct. 20, 2020

(54) ZEOLITE SYNTHESES AND DIRECTING AGENTS

(71) Applicant: ExxonMobil Research and Engineering Company, Annandale, NJ (US)

(72) Inventors: Allen W. Burton, Stewartsville, NJ (US); Hilda B. Vroman, Piscataway, NJ (US); Joseph M. Falkowski, Hampton, NJ (US); Eugene Terefenko, Center Valley, PA (US); Kanmi Mao, Basking Ridge, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 16/558,659

(22) Filed: Sep. 3, 2019

(65) Prior Publication Data
US 2020/0109058 A1     Apr. 9, 2020

Related U.S. Application Data

(60) Provisional application No. 62/741,784, filed on Oct. 5, 2018.

(51) Int. Cl.
*C01B 39/48*     (2006.01)
*C01B 39/08*     (2006.01)
(Continued)

(52) U.S. Cl.
CPC ............ *C01B 39/48* (2013.01); *C01B 39/085* (2013.01); *C01B 39/12* (2013.01); *B01J 20/10* (2013.01);
(Continued)

(58) Field of Classification Search
CPC ....... C01B 39/085; C01B 39/12; C01B 39/48; C01P 2002/72; B01J 29/70; B01J 29/86; B01J 29/89; B01J 20/10; B01J 20/18
See application file for complete search history.

(56) References Cited

U.S. PATENT DOCUMENTS

| | | | |
|---|---|---|---|
| 5,489,424 | A | 2/1996 | Balkus, Jr. et al. |
| 5,648,058 | A | 7/1997 | Balkus, Jr. et al. |

(Continued)

FOREIGN PATENT DOCUMENTS

CN     107892309 A     4/2018

OTHER PUBLICATIONS

Zi et al. "Designed synthesis of an extra-large pore zeolite with 14-membered ring channel via supramolecular assembly templating approach", Microporous and Mesoporous Materials, 290 (2019) 109654 (Year: 2019).*

(Continued)

*Primary Examiner* — David M Brunsman
(74) *Attorney, Agent, or Firm* — Priya G. Prasad

(57) ABSTRACT

The zeolite UTD-1 may be formed under hydrothermal synthesis conditions using a directing agent that does not include a metal atom therein. Methods for synthesizing the zeolite UTD-1 may comprise: combining at least a silicon atom source and a directing agent having a structure of (Continued)

in an aqueous medium; forming the zeolite in the aqueous medium under hydrothermal synthesis conditions, such that the zeolite has a framework silicate with a cationic portion of the directing agent occluded within pores or channels of the framework silicate; and isolating the zeolite from the aqueous medium. The zeolite has a powder x-ray diffraction pattern with at least the following 2θ scattering angles: 6.0±0.12, 7.6±0.1, 14.66±0.15, 19.7±0.15, 21.27±0.15, 22.13±0.15, 22.61±0.15, and 24.42±0.10 for a borosilicate form zeolite, or 6.0±0.12, 7.6±0.15, 14.55±0.15, 19.64±0.15, 21.01±0.20, 21.90±0.20, 22.34±0.20, and 24.38±0.20 for an aluminosilicate form zeolite.

26 Claims, 3 Drawing Sheets

(51) Int. Cl.
  *C01B 39/12* (2006.01)
  *B01J 20/18* (2006.01)
  *B01J 29/70* (2006.01)
  *B01J 29/86* (2006.01)
  *B01J 29/89* (2006.01)
  *B01J 20/10* (2006.01)

(52) U.S. Cl.
  CPC ............... *B01J 20/18* (2013.01); *B01J 29/70* (2013.01); *B01J 29/86* (2013.01); *B01J 29/89* (2013.01); *C01P 2002/72* (2013.01); *C01P 2002/86* (2013.01); *C01P 2004/03* (2013.01); *C01P 2004/20* (2013.01)

(56) References Cited

U.S. PATENT DOCUMENTS

| | | |
|---|---|---|
| 6,103,215 A | 8/2000 | Zones et al. |
| 2010/0260665 A1 | 10/2010 | Archer et al. |

OTHER PUBLICATIONS

Raul F. Lobo,"Characterization of the Extra-Large-Pore Zeolite UTD-1",§ Journal of the American Society 1997 119 (36), 8474-8484.
K.J. Balkus, et al., "Molecular Sieve Synthesis using Metallocenes as Structure Directing Agents," Mater. Res. Soc. Symp. Proc., 1995, p. 369, 368.
K.J. Balkus,Jr.,"The synthesis of UTD-1, Ti-UTD-1 and Ti-UTD-8 using CP*2CoOH as a structure directing agent" Stud. Surf. Sci. Catal. vol. 97 (1995) 519-525.
K.J. Balkus, et al., "Molecular Sieve Ti-UTD-1: A Novel Oxidation Catalyst," Stud. Surf. Sci. Catal., 1996, pp. 1341-1348, 101.
K.J. Balkus, et al., "The Synthesis and Characterization of UTD-1: The First Large Pore Zeolite Based on a 14 Membered Ring System," Stud. Surf. Sci. Catal., 1995, pp. 415-421, 105.
R.F. Lobo, et al., "New Descriptor of the Disorder in Zeolite ZSM-48," J. Am. Chem. Soc., 2002, pp. 13222-13230, 124.
H. Van Koningsveld, et al., "Disorder in Zeolite SSZ-31 Described on the Basis of One-Dimensional Building Units," J. Phys. Chem. B, 2003, pp. 10983-10989, 107.
T. Wessels, et al., "An Ordered Form of the Extra-Large-Pore Zeolite UTD-1: Synthesis and Structure Analysis from Powder Diffraction Data," J. Am. Chem. Soc., 1999, pp. 6242-6247, 121.
M. Yoshikawa, et al., "Synthesis, Characterization, and Structure Solution of CIT-5, a New, High-Silica, Extra-Large-Pore Molecular Sieve," J. Phys. Chem. B, 1998, pp. 7139-7147, 102.
A. Burton, et al., "SSZ-53 and SSZ-59: Two Novel Extra-Large Pore Zeolites," Chem. Eur. J., 2003, pp. 5737-5748, 9.
K.G. Strohmaier, et al., "Structure of the First Silicate Molecular Sieve with 18-ring Pore Openings, ECR-34," J. Am. Chem. Soc., 2003, pp. 16035-16039, 125.
J.-L. Paillaud, et al., "Extra-Large-Pore Zeolites with Two-Dimensional Channels Formed by 14-and 12-Rings," Science, 2004, pp. 990-992, 304.
A. Corma, et al., "The First Ultralarge Pore Zeolite with a Bi-Directional Pore System Formed by Intersecting 14-and 12-Ring Channels, and Its Catalytic Implications," Chem. Comm., 2004, pp. 1356-1357.
A. Corma, et al,. "Pure Polymorph C of Zeolite Beta Synthesized by Using Framework Isomorphous Substitution as a Structure-Directing Mechanism," Angew. Chem. Int. Ed., 2001, pp. 2277-2280, 40.
A. Corma, et al., "A Large-Cavity Zeolite with Wide Pore Windows and Potential as an Oil Refining Catalyst," Nature, 2002, pp. 514-517, 418.
A. Corma, et al., "A Zeolite with Interconnected 8-, 10- and 12-Ring Pores and Its Unique Catalytic Selectivity," Nature Mater., 2003, pp. 493-497, 2.
J.H. Kang, et al., "Synthesis and Characterization of CIT-13, a Germanosilicate Molecular Sieve with Extra-Large Pore Openings," Chem. Mater., 2016, pp. 6250-6259, 28.
G.O. Brunner, et al., "Framework Density Distribution of Zeolite-Type Tetrahedral Nets," Nature, 1989, pp. 146-147, 337.
J. Sun, et al., "The ITQ-37 Mesoporous Chiral Zeolite," Nature, 2009, pp. 1154-1157, 458.
A. Corma, et al., "The High-Throughput Synthesis and Catalytic Properties of a Molecular Sieve with 18- and 10-Member Rings," Nature, 2006, pp. 842-845, 443.
A. Corma, et al., "Extra-Large Pore Zeolite (ITQ-40) with the Lowest Framework Density Containing Double Four- and Double Three-Rings," Proc. Natl. Acad. Sci., 2010, pp. 13997-14002, 107.
J. Jiang, et al., "The Synthesis of an Extra-Large-Pore Zeolite with Double Three-Ring Building Units and a Low Framework Density," Angew. Chem. Int. Ed., 2010, pp. 4986-4988, 49.
J. Jiang, et al., "ITQ-54: A Multi-Dimensional Extra-Large Pore Zeolite with 20×14×12 Ring Channels." Chem. Sci., 2015, pp. 480-485, 6.
H. Xu, et al., "Post-Synthesis Treatment Gives Highly Stable Siliceous Zeolites Through the Isomorphous Substitution of Silicon for Germanium in Germanosilicates," Angew. Chem. Int. Ed., 2014, pp. 1355-1359, 53.
Bourson et al: "Études en série benzimidazolique. II.—Action des bases sur les sels de diméthyl-1,3 benzimidazolium", Bulletin de la Societe Chimique de France, Societe Francaise de Chimie. Paris, France, No. 1, Jan. 1, 1971 (Jan. 1, 1971), pp. 152-159, XP009500020, ISSN: 0037-8968 *.

* cited by examiner

ZEOLITE SYNTHESES AND DIRECTING AGENTS

CROSS-REFERENCE TO RELATED APPLICATIONS

This application claims the benefit of U.S. Provisional Application No. 62/741,784, filed on Oct. 5, 2018, the entire contents of which are incorporated herein by reference.

FIELD

The present disclosure relates to zeolite syntheses using a directing agent.

BACKGROUND

Zeolites are a family of porous materials having a regular inorganic framework structure with a plurality of pores or channels of set size that are defined therein. The pore or channel size varies for different zeolites and determines the breadth of molecules that may enter the interior of a particular zeolite. Because of their microporosity of defined size and the molecular specificity gained therefrom, zeolites often find particular utility in adsorption, ion-exchange, gas separation, and catalyst applications. Various zeolite framework structures recognized by the Structure Commission of the International Zeolite Association are maintained in a structural database accessible at http://www.iza-structure.org/databases.

The idealized inorganic framework structure of zeolites is a framework silicate in which all tetrahedral atoms are connected by oxygen atoms with the four next-nearest tetrahedral atoms. The term "silicate," as used herein, refers to a substance containing at least silicon and oxygen atoms that are alternately bonded to each other (i.e., —O—Si—O—Si—), and optionally including other atoms within the inorganic framework structure, including atoms such as boron, aluminum, or other metals (e.g., transition metals, such as titanium, vanadium, or zinc). Atoms other than silicon and oxygen in the framework silicate occupy a portion of the lattice sites otherwise occupied by silicon atoms in an 'all-silica' framework silicate. Thus, the term "framework silicate," as used herein, refers to an atomic lattice comprising any of a silicate, borosilicate, gallosilicate, ferrisilicate, aluminosilicate, titanosilicate, zincosilicate, vanadosilicate, or the like.

The structure of the framework silicate within a given zeolite determines the size of the pores or channels that are present therein. The pore or channel size may determine the types of processes for which a given zeolite is applicable. Currently, greater than 200 unique zeolite framework silicate structures are known and recognized by the Structure Commission of the International Zeolite Association, thereby defining a range of pore geometries and orientations. The framework silicates of zeolites are commonly characterized in terms of their ring size, wherein the ring size refers to the number of silicon atoms (or alternative atoms, such as those listed above) that are tetrahedrally coordinated with oxygen atoms in a loop to define a pore or channel within the interior of the zeolite. For example, an "8-ring" zeolite refers to a zeolite having pores or channels defined by 8 alternating tetrahedral atoms and 8 oxygen atoms in a loop. The pores or channels defined within a given zeolite may be symmetrical or asymmetrical depending upon various structural constraints that are present in the particular framework silicate.

The most common zeolites have medium or large pores or channels that are in the range of about 3-7.5 Å in size. Zeolites having extra large pores or channels approaching 10 Å are comparatively rare, even though there may be a desire to produce such zeolites for use in catalytic reactions or other types of processes requiring size specificity for larger molecules.

UTD-1 is a 14-ring zeolite having a pore size reaching 10 Å in size in one dimension. FIG. 1 shows a diagram of the structure of the framework silicate in UTD-1 zeolite. Each vertex represents a silicon atom (or alternative atom) that is tetrahedrally coordinated to four oxygen atoms. The silicon atoms (or alternative atoms) define a loop containing 14 atoms that are each tetrahedrally coordinated to four oxygen atoms. Pores 2 in UTD-1 zeolite 1 are characterized by dimension $L_1$ of 7.5 Å and dimension $L_2$ of 10 Å. Pores 2 define a series of one-dimensional channels extending in parallel to one another into the plane of the page in FIG. 1.

UTD-1 was the first 14-ring zeolite to be reported in the literature. Although UTD-1 is typically a disordered structure, one ordered polytype of UTD-1 is recognized as having a DON framework by the Structure Commission of the International Zeolite Association. Other 14-ring zeolites have since been reported, but their particular structures are characterized by pores or channels that are smaller than those of UTD-1. Other extra large-pore zeolites approaching the pore size of UTD-1 have been synthesized, though not necessarily featuring a 14-ring framework silicate. Many of these alternative extra large-pore zeolites are problematic compared to UTD-1. Namely, certain alternative extra large-pore zeolites incorporate germanium or gallium atoms in the framework silicate, which may present hydrolytic stability issues. A transition of the zeolite from a crystalline state to an amorphous state may also accompany hydrolysis in some cases. Moreover, germanium is a relatively expensive and rare element, which may make extra large-pore zeolites incorporating this element somewhat infeasible for use in industrial scale applications.

UTD-1 has been conventionally synthesized under hydrothermal synthesis conditions using a metallocene directing agent (DA), sometimes referred to as a structure directing agent, which is shown in Formula 1 below.

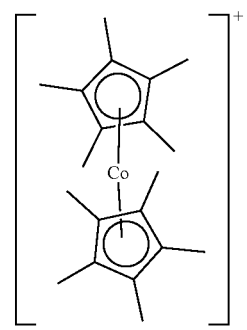

Formula 1

The metallocene of Formula 1 is a cobalticinium compound in which the cobalt atom bears a +3 oxidation state and the complex bears an overall charge of +1. The counterion in a zeolite synthesis is typically hydroxide. To date, the directing agent of Formula 1 and closely related cobalticinium structural analogues (e.g., analogues lacking one methyl group on the cyclopentadienyl rings) are the only ones that have been found to form UTD-1 successfully under hydrothermal synthesis conditions. Even so, some atoms cannot be successfully incorporated directly into the framework silicate of UTD-1 under hydrothermal synthesis conditions using the directing agent of Formula 1 or related structural analogues. For example, aluminum cannot be incorporated in the framework silicate of UTD-1 in appreciable amounts using the directing agent of Formula 1 and conventional hydrothermal synthesis conditions. Instead, aluminum and other atoms that cannot be incorporated under hydrothermal synthesis conditions are introduced to the framework silicate in a post-synthesis exchange reaction.

Following a templated synthesis of UTD-1 under hydrothermal synthesis conditions using the directing agent of Formula 1 or a related cobalticinium analogue, the zeolite is often calcined in air or oxygen at elevated temperatures. In addition to dehydrating the zeolite, calcination removes the carbonaceous (organic) components of the metallocene directing agent, but leaves behind the cobalt in the form of cobalt (III) oxide deposited on the surface of the zeolite. Although the cobalt (III) oxide may remain in place for some UTD-1 applications, it can complicate the interpretation of catalytic data and/or decrease catalytic activity or adsorption capacity, so its removal is often desirable. Removal of the cobalt (III) oxide from the zeolite surface following calcination may be realized using a mineral acid, such as HCl or $HNO_3$, but such acid treatment may remove a substantial portion of trivalent alternative atoms that may be incorporated in the framework silicate, such as aluminum or boron. Thus, conventional synthetic methods for forming UTD-1 may be limited in the amounts of trivalent atoms they are able to incorporate and/or maintain within the framework silicate.

SUMMARY

In certain aspects, the present disclosure provides zeolite synthesis processes comprising: combining at least a silicon atom source and a directing agent having a structure of

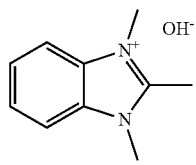

in an aqueous medium; forming a zeolite in the aqueous medium under hydrothermal synthesis conditions, the zeolite having a framework silicate with a cationic portion of the directing agent occluded within pores or channels of the framework silicate; and isolating the zeolite from the aqueous medium. The zeolite has a powder x-ray diffraction pattern with at least the following 2θ scattering angles: 6.0±0.12, 7.6±0.1, 14.66±0.15, 19.7±0.15, 21.27±0.15, 22.13±0.15, 22.61±0.15, and 24.42±0.10 for a borosilicate form zeolite, or 6.0±0.12, 7.6±0.15, 14.55±0.15, 19.64±0.15, 21.01±0.20, 21.90±0.20, 22.34±0.20, and 24.38±0.20 for an aluminosilicate form zeolite.

In other aspects, the present disclosure provides non-calcined zeolites containing a directing agent associated with the framework silicate. The non-calcined zeolites comprise: a framework silicate having a plurality of pores or channels defined therein, and a cationic portion of a directing agent having a structure of

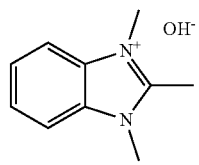

occluded within the pores or channels. The zeolite has a powder x-ray diffraction pattern with at least the following 2θ scattering angles: 6.0±0.12, 7.6±0.1, 14.66±0.15, 19.7±0.15, 21.27±0.15, 22.13±0.15, 22.61±0.15, and 24.42±0.10 for a borosilicate form zeolite, or 6.0±0.12, 7.6±0.15, 14.55±0.15, 19.64±0.15, 21.01±0.20, 21.90±0.20, 22.34±0.20, and 24.38±0.20 for an aluminosilicate form zeolite.

In other aspects, the present disclosure provides zeolites comprising: a framework silicate having a plurality of pores or channels defined therein, in which aluminum atoms are incorporated in the framework silicate and the zeolite has a Si:Al atomic ratio of about 15:1 or lower. The zeolite has a powder x-ray diffraction pattern with at least the following 2θ scattering angles: 6.0±0.12, 7.6±0.15, 14.55±0.15, 19.64±0.15, 21.01±0.20, 21.90±0.20, 22.34±0.20, and 24.38±0.20.

In still other aspects, the present disclosure describes compositions comprising:

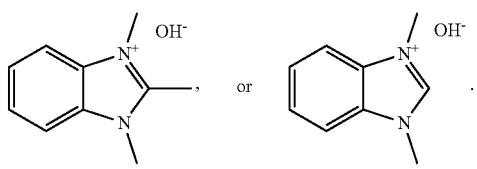

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one of ordinary skill in the art and having the benefit of this disclosure.

DETAILED DESCRIPTION

Figure 1:
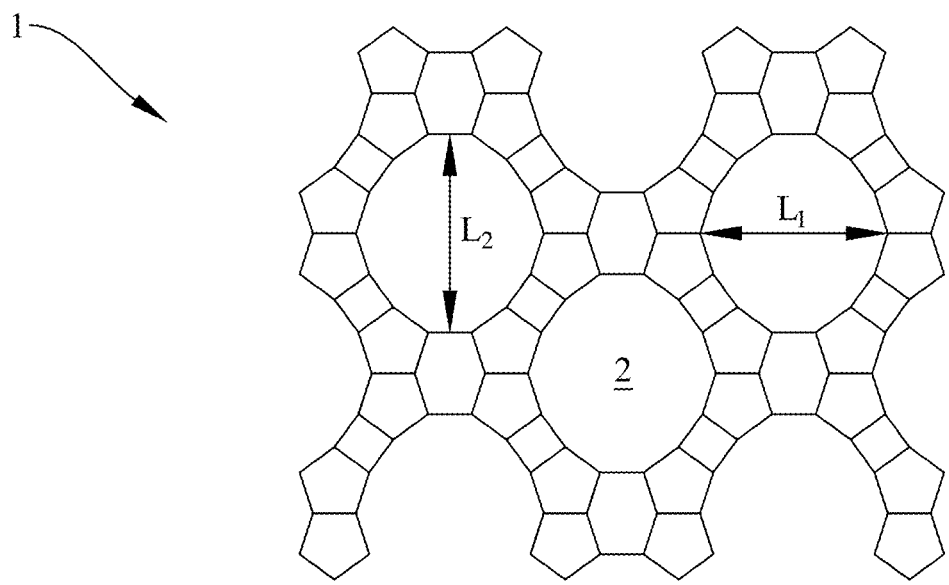
FIG. 1 shows a diagram of the structure of the framework silicate in UTD-1 zeolite.

The present disclosure generally relates to zeolite syntheses using a directing agent and, more specifically, to zeolite syntheses using a directing agent lacking a metal component.

As discussed above, UTD-1 zeolite can be prepared under hydrothermal synthesis conditions using a cobalticinium directing agent, such as that shown in Formula 1 or a closely related structural analogue. However, conventional syntheses of UTD-1 using cobalticinium directing agents may present several issues. Foremost, free cobalt (III) oxide may need to be removed from the zeolite following calcination, which leads to additional processing costs and loss of trivalent atoms, such as aluminum, from the framework silicate. In addition, hydrothermal syntheses employing cobalticinium directing agents, while capable of directly incorporating boron atoms or titanium atoms in the framework silicate during a hydrothermal synthesis reaction, are generally ineffective for incorporating aluminum atoms in the framework silicate or the amount of incorporated aluminum may be much less than desired. Although aluminum or other atoms may be exchanged post-synthesis for silicon and/or boron within the framework silicate following hydrothermal synthesis and calcination, the exchange process may increase processing costs and the amount of incorporated aluminum may be less than desired.

The present disclosure provides the surprising discovery of a benzimidazolium directing agent for synthesizing UTD-1 in various forms that is wholly unrelated structurally to cobalticinium complexes. Advantageously, the UTD-1 structure directing agent disclosed herein is not a metal complex, thereby allowing UTD-1 to be formed and calcined without leaving substantial quantities of unwanted metal oxide upon the surface of the zeolite. Various UTD-1 compositions that are inaccessible with conventional cobalticinium directing agents may be produced using the benzimidazolium directing agents disclosed herein.

More specifically, the present disclosure demonstrates that the compound 1,2,3-trim ethylbenzimidazolium hydroxide or related compounds may serve as an effective directing agent for synthesizing UTD-1 under hydrothermal synthesis conditions. Alternative anion forms, such as halides, acetates, sulfates, tetrafluoroborates, and carboxylates, for example, may also be effectively used. The hydroxide form may be particularly advantageous, however, since the hydrothermal synthesis conditions can be carried out under alkaline conditions without introducing additional quantities of alkali metal cations from alkali metal hydroxide sources. The structure of the benzimidazolium directing agent in its hydroxide counted on form is shown in Formula 2 below. Other structural variants of Formula 2 may also be used, as discussed below.

Formula 2

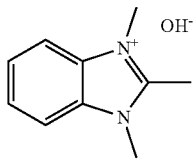

Without being bound by any theory or mechanism, it is believed that the benzimidazolium directing agent of Formula 2 may associate by pi-stacking, such a pi-stacked dimer, which may explain its ability to promote the synthesis of UTD-1, including affording particular synthetic advantages that are not available with cobalticinium directing agents, as discussed further below. The cationic portion of the benzimidazolium directing agent may become associated within UTD-1 during the hydrothermal synthesis process.

A leading advantage of the benzimidazolium directing agent of the present disclosure is that it may be removed from the zeolite via. calcination without leaving behind substantial quantities of metal oxide residue. As such, it may be possible to forego a post-calcination acid. treatment when synthesizing UTD-1 according to the present disclosure. Foregoing a post-calcination acid treatment may better preserve the framework silicate in UTD-1 variants containing trivalent atoms, such as aluminum, since a portion of the framework silicate is no longer washed away (removed) concurrently with the surface metal oxides arising from the directing agent.

Another surprising and significant advantage of the benzimidazolium directing agent of the present disclosure is that it allows UTD-1 to be synthesized with direct incorporation of trivalent atoms, such as aluminum atoms, in the framework silicate during the hydrothermal synthesis, in contrast to syntheses conducted using cobahicinium directing agents. Aluminum atoms are introduced into the framework silicate of UTD-1 formed using cobalticinium directing agents in a post-synthesis aluminum exchange process in which framework boron atoms are replaced with aluminum atoms. The aluminum exchange process generally introduces lower quantities of aluminum atoms than can be introduced using the direct syntheses disclosed herein. Tetravalent atoms such as titanium may also be incorporated readily into the framework silicate using the directing agent disclosed herein. Again without being bound by any theory or mechanism, it is believed that the presence of two ionic charges that are spatially separated from one another in a pi-stacked dimer may promote more efficient incorporation of trivalent atoms than is possible when using cobalticinium complexes bearing a single ionic charge.

Finally, a variety of organic syntheses are available for modifying a benzimidazole ring system, thereby facilitating ready synthesis of structural variants of Formula 2. For example, additional functionality may be introduced onto the fused benzene ring at any position, and/or alternative alkyl groups may be introduced at any one or more of the 1-, 2-, or 3-positions of the imidazole ring. Further alternately, the 2-position methyl group may be replaced with hydrogen in another structural variant of the benzimidazolium directing agent disclosed herein (i.e., 1,3-dimethylbenzimidazolium hydroxide). Certain members of these alternative directing agents may be effective for synthesizing the framework silicate of UTD-1 (optionally incorporating alternative atoms such as boron, aluminum, or transition metals therein), or for synthesizing other zeolites, having structures that are presently known or unknown.

Before describing the processes and compositions of the present disclosure in further detail, a listing of terms follows to aid in better understanding the present disclosure.

All numerical values within the detailed description and the claims herein are modified by "about" or "approximately" with respect to the indicated value, and take into account experimental error and variations that would be expected by a person having ordinary skill in the art. Unless otherwise indicated, room temperature is about 25° C.

As used in the present disclosure and claims, the singular forms "a," "an," and "the" include plural forms unless the context clearly dictates otherwise.

The term "and/or" as used in a phrase such as "A and/or B" herein is intended to include "A and B," "A or B," "A", and "B."

For the purposes of the present disclosure, the new numbering scheme for groups of the Periodic Table is used. In said numbering scheme, the groups (columns) are numbered sequentially from left to right from 1 through 18, excluding the f-block elements (lanthanides and actinides). Group 1 refers to alkali metals, and Group 2 refers to alkaline earth metals.

As used herein, the term "aqueous medium" refers to a liquid comprising predominantly water, particularly about 90 vol. % water or greater. Suitable aqueous media may comprise or consist essentially of water or mixtures of water and a water-miscible organic solvent.

As used herein, the term "trivalent" refers to an atom having a +3 oxidation state.

As used herein, the term "tetravalent" refers to an atom having a +4 oxidation state.

As used herein, the term "directing agent" refers to a templating compound that may promote zeolite synthesis.

As used herein, the terms "calcine," "calcination," and similar variants refer to the process of heating in air or oxygen above a specified temperature.

As used herein, the term "hydrothermal synthesis" refers to a process in which water and reactants are heated in a closed vessel at a specified temperature for a specified time.

As used herein, the term "alpha value" refers to a measure of the catalytic activity of a zeolite. The catalytic activity characterized as the "alpha value" may refer to the first order rate constant of n-hexane cracking in a continuous flow reactor at 1000° F. (538° C.) at an n-hexane concentration of 13 mol.

The terms "atomic ratio," "mole ratio" and "on a molar basis" are used synonymously herein.

Accordingly, zeolite synthesis processes of the present disclosure may comprise:

combining at least a silicon atom source and a directing agent having a structure of Formula 2 in an aqueous medium; forming a zeolite in the aqueous medium under hydrothermal synthesis conditions, the zeolite having a framework silicate with at least a portion of a cationic portion of the directing agent occluded within pores or channels of the framework silicate; and isolating the zeolite from the aqueous medium. The zeolite formed in this manner is UTD-1, which is characterized powder x-ray diffraction. More specifically, zeolites produced according to the disclosure herein may have a powder x-ray diffraction pattern with at least the following 2θ scattering angles: 6.0±0.12, 7.6±0.1, 14.66±0.15, 19.7±0.15, 21.27±0.15, 22.13±0.15, 22.61±0.15, and 24.42±0.10 for a borosilicate form zeolite, or 6.0±0.12, 7.6±0.15, 14.55±0.15, 19.64±0.15, 21.01±0.20, 21.90±0.20, 22.34±0.20, and 24.38±0.20 for an aluminosilicate form zeolite. Similar powder x-ray diffraction patterns may be obtained for as-synthesized (non-calcined) zeolites or zeolites that have undergone further calcination, as discussed further herein. The above powder x-ray diffraction scattering angles may represent those obtained using CuK-α radiation.

Minor variations in the powder x-ray diffraction pattern (e.g., experimental variation in peak ratios and peak positions) can result from variations in the atomic ratios of the framework atoms due to changes in lattice constants. In addition, sufficiently small crystals may affect the shape and intensity of peaks, possibly leading to peak broadening. Calcination can also cause minor shifts in the powder x-ray diffraction pattern compared to the pre-calcination powder x-ray diffraction pattern. Notwithstanding these minor perturbations, the crystal lattice structure may remain unchanged following calcination.

Isolating the zeolite from the aqueous medium may comprise filtering, decanting, and/or centrifuging the aqueous medium to obtain the zeolite in solid form. Once separated from the aqueous medium, the zeolite may be washed with water or another suitable fluid to remove impurities remaining from the hydrothermal synthesis. Generally, the directing agent remains associated with framework silicate at this juncture and is not removed during washing. Excess directing agent that does not become occluded within the framework silicate during the hydrothermal synthesis is removed during washing at this juncture.

The zeolite synthesis processes of the present disclosure may further comprise calcining the zeolite in air or oxygen to form a calcined zeolite that is free or substantially free of the directing agent. Suitable calcination temperatures may range from about 350° C. to about 1000° C., or about 400° C. to about 700° C., or about 450° C. to about 650° C. Calcination may oxidize the directing agent into gaseous products which then exit the framework silicate of the zeolite. The framework silicate of the zeolite is substantially unaffected by the calcination process, as evidenced by characteristic scattering angles of the powder x-ray diffraction spectrum remaining largely unchanged between the pre-calcination zeolite and the post-calcination zeolite. Suitable calcination times may range from about 1 hour to about 48 hours, or even longer.

The zeolite synthesis processes of the present disclosure may be used to synthesize the framework silicate of UTD-1 containing only silicon atoms and oxygen atoms. Alternately, a trivalent atom and/or a tetravalent atom may replace at least a portion of the silicon atoms in the framework silicate. The trivalent and/or tetravalent atoms may be introduced directly under the hydrothermal synthesis conditions. Accordingly, the zeolite synthesis processes of the present disclosure may further comprise combining at least one of a trivalent atom source or a tetravalent atom source with the silicon atom source and the directing agent in the aqueous medium employed in the zeolite synthesis processes. Trivalent atoms that may be incorporated include, for example, boron, gallium, iron, and aluminum. Tetravalent atoms that may be incorporated include, for example, titanium and vanadium. Divalent atoms such as zinc may also be suitably incorporated.

Hydrothermal synthesis conditions suitable for synthesizing zeolites, including UTD-1, may comprise heating the aqueous medium in a sealed container above the boiling point of water. Thus, suitable hydrothermal synthesis conditions may comprise heated a sealed aqueous solution or suspension of reactants at a temperature of at least about 100° C., or a temperature of at least about 150° C. for a period of time, such as in a range from about 100° C. to about 300° C., or from about 110° C. to about 250° C., or from about 120° C. to about 200° C., or from about 130° C. to about 180° C. The period of time may extend from about 1 day to about 30 days, or about 4 days to about 28 days, or about 4 days to about 14 days, or about 5 days to about 10 days. Accordingly, specific hydrothermal synthesis conditions may comprise heating the aqueous medium in a sealed container at a temperature of at least about 150° C., particularly about 150° C. to about 200° C., for a period of time of about 2 days or greater, particularly about 4 days to about 30 days. The aqueous medium may be sealed in a vessel, such as an autoclave vessel or 'bomb' in various process configurations.

In some instances, seed crystals may be included in the aqueous medium. When used, the seed crystals may be present in the aqueous medium in an amount from about 0.1 wt. % to about 10 wt. % relative to silicon from the silicon atom source. The seed crystals may be obtained from a previous hydrothermal synthesis of the zeolite. Although seed crystals may facilitate crystallization of the zeolite according to the present disclosure, it is to be appreciated that the zeolite synthesis processes disclosed herein may also proceed without seed crystal use. When seed crystals are not employed, slower zeolite crystallization may be observed, in which case longer hydrothermal reaction times may be utilized.

After combining the silicon atom source and the directing agent with the aqueous medium, a gel may form in some instances. Gel formation may depend upon the amounts of silicon atoms and aluminum or boron atoms that are present. Heating of the gel under hydrothermal synthesis conditions may likewise result in zeolite formation according to the disclosure herein.

Silica, including various forms thereof, may be a suitable silicon atom source in the zeolite synthesis processes disclosed herein. More specific forms of silica that may be suitably used include, for example, precipitated silica, fumed silica, silica hydrogels, colloidal silica, hydrated silica, or any combination thereof. The silica may be suspended in the aqueous medium prior to being exposed to the hydrothermal synthesis conditions disclosed herein. Alternative silicon atom sources suitable for use according to the disclosure herein may include, for example, tetraethylorthosilicate or other tetraalkylorthosilicates, sodium silicate, silicic acid, other zeolites, and similar compounds.

Suitable trivalent atoms for incorporation in the framework silicate of UTD-1 may include boron, gallium, iron, or aluminum, for example. Suitable tetravalent atoms for incorporation in the framework silicate of UTD-1 may include transition metals (e.g., titanium or vanadium). As mentioned above, the zeolite synthesis processes of the present disclosure may be particularly advantageous due to their ability to incorporate aluminum atoms and other trivalent atoms in the framework silicate of UTD-1 directly, rather than having to perform a post-synthesis exchange of aluminum for boron, for example. Alternately, however, post-synthesis exchange of aluminum for boron may be employed to introduce aluminum atoms into the framework silicate of UTD-1 synthesized according to the present disclosure, as discussed further hereinbelow.

Certain variants of UTD-1 may comprise a framework silicate incorporating boron atoms. Borate salts (e.g., sodium tetraborate or borax, potassium tetraborate) or boric acid may be suitable trivalent atom sources for incorporating boron atoms into the framework silicate of UTD-1 according to the present disclosure. The borate salts or boric acid may be suspended or at least partially dissolved in the aqueous medium prior to being exposed to the hydrothermal synthesis conditions disclosed herein. When boron is incorporated in the framework silicate of UTD-1 according to the present disclosure, the zeolite may have a Si:B atomic ratio of about 100:1 to about 5:1, or about 100:1 to about 10:1, or about 60:1 to about 10:1, or about 50:1 to about 15:1, or about 40:1 to about 20:1, or about 50:1 to about 5: or about 40:1 to about 5:1, or about 30:1 to about 5:1, or about 20:1 to about 5:1.

Certain variants of UTD-1 may comprise a framework silicate incorporating titanium atoms. Titanium dioxide may be a suitable tetravalent atom source for incorporating titanium atoms into the framework silicate of UTD-1. Alternately, titanium tetraalkoxides, such as titanium (IV) tetraethoxide, or titanium (IV) tetrachloride may be suitable titanium atom sources. The titanium dioxide may be suspended or gelled in the aqueous medium prior to being exposed to the hydrothermal synthesis conditions disclosed herein. When titanium is incorporated in the framework silicate of UTD-1 according to the present disclosure, the zeolite may have a Si:Ti atomic ratio of about 100:1 to about 30:1, or about 80:1 to about 35:1, or about 70:1 to about 40:1, or about 50:1 to about 30:1.

Certain variants of UTD-1 may comprise a framework silicate incorporating aluminum atoms. Alumina, including various forms thereof, may be a suitable trivalent atom source for incorporating aluminum atoms into the framework silicate of UTD-1. Other suitable aluminum atom sources may include, for example, hydrated alumina, aluminum hydroxide, clay (e.g., metakaoiin clay), aluminum nitrate, aluminum sulfate, aluminates, or other zeolites. The alumina to or alternative source of aluminum atoms may be suspended or gelled in the aqueous medium prior to being exposed to the hydrothermal synthesis conditions disclosed herein. When aluminum is incorporated in the framework silicate of UTD-1 according to the present disclosure, the zeolite may have a Si:Al atomic ratio of about 100:1 to about 10:1, or about 80:1 to about 35:1, or about 70:1 to about 40:1, or about 30:1 to about 10:1, or about 20:1 to about 10:1, or about 15:1 to about 10:1. Particular embodiments may include variants of UTD-1 in which the Si:Al atomic ratio is less than about 15:1, particularly ranging from about 15:1 to about 10:1.

Accordingly, some embodiments of the zeolites disclosed herein may comprise a framework silicate having a plurality of pores or channels defined therein, in which the zeolite has a powder x-ray diffraction pattern with at least the following $2\theta$ scattering angles: 6.0±0.12, 7.6±0.15, 14.55±0.15, 19.64±0.15, 21.01±0.20, 21.90±0.20, 22.34±0.20, and 24.38±0.20, and aluminum atoms are incorporated in the framework silicate such that the zeolite has a Si:Al atomic ratio of about 15:1 or lower, particularly a Si:Al atomic ratio of about 15:1 to about 10:1. Such zeolites may be pre-calcination (non-calcined) zeolites or post-calcination (calcined) zeolites, with a cationic portion of the directing agent of Formula 2 being present in the former and absent or substantially absent from the latter. When present, the cationic portion of the directing agent is occluded within pores or channels of the zeolite.

Two or more sources of trivalent atoms and/or tetravalent atoms may be incorporated in the zeolite synthesis processes disclosed herein. For example, UTD-1 synthesized using the zeolite synthesis processes of the present disclosure may feature a framework silicate comprising boron and aluminum, boron and titanium, or aluminum and titanium. Ternary combinations of boron, aluminum, and titanium are also within the scope of the present disclosure. Other higher-level combinations of trivalent and tetravalent atoms also reside within the scope of the present disclosure. When two or more sources of trivalent atoms and/or tetravalent atoms are used, the atomic ratio of silicon to the sum of the atomic ratios of the two or more sources of trivalent and/or tetravalent atoms e.g., the sum of the atomic ratios of boron, aluminum and any other alternative atoms) may range from about 100:1 to about 10:1, or about 100:1 to about 15:1, or about 100:1 to about 30:1.

The aqueous medium employed for synthesizing UTD-1 may comprise an alkali metal base or an alkaline earth metal base. Alkali metal cations from the alkali metal base may promote additional incorporation of trivalent atoms, such as aluminum, in some instances. Particularly suitable alkali metal bases for use in the zeolite synthesis processes disclosed herein may include, for example, lithium hydroxide, sodium hydroxide, potassium hydroxide, or any combination thereof. Suitable alkaline earth metal bases may include, for example, strontium hydroxide and barium hydroxide. Suitable amounts of the alkali metal base may be chosen such that an atomic ratio of the alkali metal (or hydroxide)

within the alkali metal base relative to silicon ranges from about 0.05 to about 0.5, or about 0.1 to about 0.4, or about 0.15 to about 0.35. In other instances, the aqueous medium may lack an added alkali metal base. An alkali metal base or alkaline earth metal based may be suitably omitted when the directing agent is in the hydroxide counterion form.

Likewise, the atomic ratio of the directing agent to silicon in the aqueous medium may vary over a wide range in the zeolite synthesis processes disclosed herein. Suitable ratios of the directing agent to silicon may range from about 0.2:1 to about 0.4:1.

As mentioned above, the zeolite synthesis processes of the present disclosure may be advantageous due to their ability to incorporate aluminum directly into the framework silicate of UTD-1 during a hydrothermal synthesis reaction. Alternately, aluminum atoms may be introduced to the framework silicate during an exchange process following a hydrothermal synthesis reaction. Framework silicates comprising boron atoms may be particularly efficacious for undergoing exchange with aluminum atoms. Such exchange processes may comprise exposing the zeolite to an aqueous solution comprising an aluminum salt, and exchanging at least a portion of the boron atoms in the framework silicate with aluminum atoms from the aluminum salt in the aqueous solution. Suitable aluminum salts may exhibit at least some degree of solubility in water or other suitable aqueous media. Particularly suitable aluminum salts for exchanging aluminum atoms into the framework silicate in this manner may include, for example, aluminum chloride, aluminum acetate, aluminum sulfate, and aluminum nitrate.

Accordingly, pre-calcination (non-calcined) zeolites produced in accordance with the disclosure above may comprise: a framework silicate having a plurality of pores or channels defined therein, and a cationic portion of a directing agent having Formula 2 that is associated. within the pores or channels of the framework silicate. Such zeolites may be characterized as having a powder x-ray diffraction pattern with at least the following 2θ scattering angles: 6.0±0.12, 7.6±0.1, 14.66±0.15, 19.7±0.15, 21.27±0.15, 22.13±0.15, 22.61±0.15, and 24.42±0.10 for a borosilicate form zeolite, or 6.0±0.12, 7.6±0.15, 14.55±0.15, 19.64±0.15, 21.01±0.20, 21.90±0.20, 22.34±0.20, and 24.38±0.20 for an aluminosilicate form zeolite.

The pre-calcination. zeolites may have a silicate framework containing substantially silicon atoms and oxygen atoms. Alternately, the silicate framework may incorporate aluminum atoms, such that the zeolite has a Si:Al atomic ratio of about 100:1 to about 10:1. Further alternately or in addition to aluminum incorporation, the silicate framework may incorporate titanium atoms, such that the zeolite has a Si:Ti atomic ratio of about 100:1 to about 30:1. Still further alternately or in addition to aluminum and/or titanium incorporation, the silicate framework may incorporate boron atoms, such that the zeolite has a Si:B atomic ratio of about 100:1 to about 10:1 or about 5:1.

In still other aspects, the present disclosure provides compositions comprising the directing agents disclosed herein. More specifically, the present disclosure provides compositions comprising a benzimidazolium directing agent corresponding to Formula 2 or Formula 3 below:

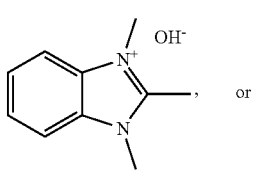

Formula 2

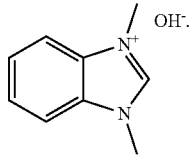

Formula 3

Particularly, the present disclosure provides aqueous solutions comprising the structure directing agent of Formula 2 or Formula 3. Any suitable concentration of the stnicture directing agent may be present in the aqueous solution, up to the solubility limit.

Embodiments disclosed herein include: A. Zeolite synthesis processes. The processes comprise: combining at least a silicon atom source and a directing agent having a structure of

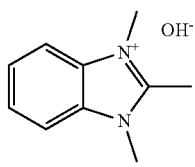

in an aqueous medium; forming a zeolite in the aqueous medium under hydrothermal synthesis conditions, the zeolite having a framework silicate with a cationic portion of the directing agent occluded within pores or channels of the framework silicate; wherein the zeolite has a powder x-ray diffraction pattern with at least the following 2θ scattering angles: 6.0±0.12, 7.6±0.1, 14.66±0.15, 19.7±0.15, 21.27±0.15, 22.13±0.15, 22.61±0.15, and 24.42±0.10 for a borosilicate form zeolite, or 6.0±0.12, 7.6±0.15, 14.55±0.15, 19.64±0.15, 21.01±0.20, 21.90±0.20, 22.34±0.20, and 24.38±0.20 for an aluminosilicate form zeolite; and isolating the zeolite from the aqueous medium.

B. Pre-calcination or non-calcined zeolites. The zeolites comprise: a framework silicate having a plurality of pores or channels defined therein; and a cationic portion of a directing agent having a structure of

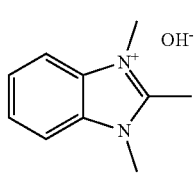

occluded within the pores or channels; wherein the zeolite has a powder x-ray diffraction pattern with at least the following 2θ scattering angles: 6.0±0.12, 7.6±0.1, 14.66±0.15, 19.7±0.15, 21.27±0.15, 22.13±0.15, 22.61±0.15, and 24.42±0.10 for a borosilicate form zeolite, or 6.0±0.12, 7.6±0.15, 14.55±0.15, 19.64±0.15, 21.01±0.20, 21.90±0.20, 22.34±0.20, and 24.38±0.20 for an aluminosilicate form zeolite.

C. Zeolites prepared with direct aluminum incorporation. The zeolites comprise: a framework silicate having a plurality of pores or channels defined therein; wherein the zeolite has a powder x-ray diffraction pattern with at least the following 2θ scattering angles: 6.0±0.12, 7.6±0.15, 14.55±0.15, 19.64±0.15, 21.01±0.20, 21.90±0.20, 22.34±0.20, and 24.38±0.20; and wherein aluminum atoms are incorporated in the framework silicate and the zeolite has a Si:Al atomic ratio of about 15:1 or lower.

D. Directing agent compositions. The compositions comprise:

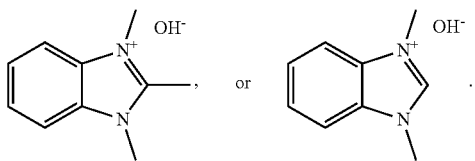

Embodiments A-D may have one or more of the following additional elements in any combination:

Element 1: wherein the powder x-ray diffraction pattern is determined using Cu Kα radiation.

Element 2: wherein the zeolite synthesis further comprises: calcining the zeolite in air or oxygen to form a calcined zeolite that is free of the directing agent.

Element 3: wherein the silicon atom source comprises a silica.

Element 4: wherein the zeolite synthesis process further comprises: combining at least one of a trivalent atom source or a tetravalent atom source with the silicon atom source and the to directing agent in the aqueous medium.

Element 5: wherein the framework silicate of the zeolite incorporates aluminum atoms.

Element 6: wherein the trivalent atom source comprises an alumina.

Element 7: wherein the zeolite has a Si:Al atomic ratio of about 100:1 to about 10:1.

Element 8: wherein the framework silicate of the zeolite incorporates titanium atoms.

Element 9: wherein the tetravalent atom source comprises titanium dioxide.

Element 10: wherein the zeolite has a Si:Ti atomic ratio of about 100:1 to about 30:1.

Element 11: wherein the framework silicate of the zeolite incorporates boron atoms.

Element 12: wherein the trivalent atom source comprises sodium tetraborate or boric acid.

Element 13: wherein the zeolite has a Si:B atomic ratio of about 100:1 to about 5:1.

Element 14: wherein the zeolite synthesis process further comprises: exposing the zeolite to an aqueous solution comprising an aluminum salt; and exchanging at least a portion of the boron atoms incorporated in the framework silicate with aluminum atoms from the aluminum salt.

Element 15: wherein the hydrothermal synthesis conditions comprise heating the aqueous medium in a sealed container above the boiling point of water.

Element 16: wherein the hydrothermal synthesis conditions comprise heating the aqueous medium in a sealed container at a temperature of at least about 150° C. for a period of time ranging from about 4 days to about 30 days.

Element 17: wherein the aqueous medium further comprises an alkali metal base.

Element 18: wherein the alkali metal base is selected from the group consisting of lithium hydroxide, sodium hydroxide, potassium hydroxide, and any combination thereof.

Element 19: wherein an atomic ratio of the directing agent to silicon in the aqueous medium ranges from about 0.2:1 to about 0.4:1.

Element 20: wherein the framework silicate incorporates aluminum atoms, and the zeolite has a Si:Al atomic ratio of about 100:1 to about 10:1.

Element 21: wherein the framework silicate incorporates titanium atoms, and the zeolite has a Si:Ti atomic ratio of about 100:1 to about 30:1.

Element 22: wherein the framework silicate incorporates boron atoms, and the zeolite has a Si:B atomic ratio of about 100:1 to about 5:1.

Element 23: wherein the Si:Al atomic ratio is about 15:1 to about 10:1.

Element 24: wherein the zeolite further comprises a cationic portion of a directing agent having a structure of

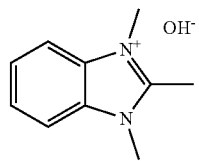

occluded within the pores or channels.

By way of non-limiting example, exemplary combinations applicable to Å include 1 and 2; 1 and 3; 1 and 4; 1 and 5; 1 and 6; 1 and 7; 1 and 8; 1 and 10; 1 and 11; 1 and 13; 1, 13 and 14; 1 and 15; 1 and 16; 1 and 17; 1 and 19; 1 and 20; 1 and 21; 1 and 22; 1 and 23; 2 and 3; 2 and 4; 2 and 5; 2 and 6; 2 and 7; 2 and 8; 2 and 10; 2 and 11; 2 and 13; 2, 13 and 14; 2 and 15; 2 and 16; 2 and 17; 2 and 19; 2 and 20; 2 and 21; 2 and 22; 2 and 23; 3 and 4; 3 and 5; 3 and 6; 3 and 7; 3 and 8; 3 and 10; 3 and 11; 3 and 13; 3, 13 and 14; 3 and 15; 3 and 16; 3 and 17; 3 and 19; 3 and 20; 3 and 21; 3 and 22; 3 and 23; 4 and 5; 4 and 6; 4 and 7; 4 and 8; 4 and 10; 4 and 11; 4 and 13; 4, 13 and 14; 4 and 15; 4 and 16; 4 and 17; 4 and 19; 4 and 20; 4 and 21; 4 and 22; 4 and 23; 5 and 6; 5 and 7; 5 and 8; 5 and 10; 5 and 11; 5 and 13; 5, 13 and 14; 5 and 15; 5 and 16; 5 and 17; 5 and 19; 5 and 20; 5 and 21; 5 and 22; 5 and 23; 7 and 8; 7 and 10; 7 and 11; 7 and 13; 7, 13 and 14; 7 and 15; 7 and 16; 7 and 17; 7 and 19; 7 and 20; 7 and 21; 7 and 22; 7 and 23; 8 and 10; 8 and 11; 8 and 13; 8, 13 and 14; 8 and 15; 8 and 16; 8 and 17; 8 and 19; 8 and 20; 8 and 21; 8 and 22; 8 and 23; 11 and 13; 11, 13 and 14; 11 and 15; 11 and 16; 11 and 17; 11 and 19; 11 and 20; 11 and 21; 11 and 22; 11 and 23; 11, 12 and 13; 11, 12, 13 and 14; 11, 12 and 15; 11, 12 and 16; 11, 12 and 17; 11, 12 and 19; 11, 12 and 20; 11, 12 and 21; 11, 12 and 22; 11, 12 and 23; 13 and 14; 13 and 15; 13 and 16; 13 and 17; 13 and 19; 13 and 20; 13 and 21; 13 and 22; 13 and 23; 14 and 15; 14 and 16; 14 and 17; 14 and 19; 14 and 20; 14 and 21; 14 and 22; 14 and 23; 15 and 16; 15 and 17; 15 and 19; 15 and 20; 15 and 21; 15 and 22; 15 and 23; 16 and 17; 16 and 19; 16 and 20; 16 and 21; 16 and 22; 16 and 23; 17 and 19; 17 and 20; 17 and 21; 17 and 22; 17 and 23; 19 and 20; 19 and 21; 19 and 22; 19 and 23; 20 and 21; 20 and 22; 20 and 23; 21 and 22; 21 and 23; and 22 and 23.

Exemplary combinations applicable to B include 1 and 20; 1 and 21; 1 and 22; 1 and 23; 20 and 21; 20 and 22; 21 and 22; and 20-22.

Exemplary combinations applicable to C include 1 and 21; 1 and 22; 1 and 23; 1, 21 and 23; 1, 22 and 23; 1 and 21-23.

To facilitate a better understanding of the embodiments described herein, the following examples of various representative embodiments are given. In no way should the following examples be read to limit, or to define, the scope of the present disclosure.

EXAMPLES

Example 1

Synthesis of 1,2,3-Trimethylbenzimidazolium Hydroxide 1,2,3-trimethylbenzimidazolium hydroxide was synthesized in two steps from 2-methylbenzimidazole as follows. The 1,2,3-trimethylbenzimidazolium hydroxide was then used as a directing agent in the zeolite syntheses outlined further below.

To a 2000 mL roundbottom flask were added 750 mL acetonitrile, and 100 g 2-methylbezimidazole (0.76 mol) was dissolved in the acetonitrile with rapid stirring. To this solution was added 169.83 g powdered KOH (3.02 mol) with rapid stirring. To the resulting suspension was added 118.14 g iodomethane (0.83 mol) dropwise with stirring. After 2 days of stirring, the KOH was removed by filtration and the acetonitrile solvent and other volatiles were removed by rotary evaporation. The crude product was then extracted from the resultant solid residues with dichloromethane. The dichloromethane was then removed from the extract by rotary evaporation to give N,2-dimethylbenzimidazole. The solid product was dried in a vacuum oven overnight.

To a 2000 mL roundbottom flask were added 530 mL acetonitrile and 58.4 g N,2-dimethylbenzimidazole (0.40 mol). After complete dissolution of the N,2-dimethylbenzimidazole, 73.7 g iodomethane (0.52 mol) was then added dropwise with rapid stirring. After 48 hours, the resulting solid product was collected by filtration, washed with ether, and dried to obtain 100.25 g of a solid product (87%). The solid product was then dissolved in water and added to 1392 mL Dowex hydroxide exchange resin. After contacting the exchange resin overnight, the resin was removed by filtration and washed with deionized water. The aqueous washes were combined with the filtrate and then concentrated with a rotary evaporator to obtain a solution of 1,2,3-trimethylbenzimidazolium hydroxide. The concentration of 1,2,3-trimethylbenzimidazolium hydroxide was 0.54 mmol/g as determined by titration with 0.1 N HCl and by $^1$H NMR.

Example 2

High-Throughput Zeolite Synthesis Screening Reactions

The directing agent (DA) from Example 1 was provided in a 5.5 wt. % aqueous solution for a series of high-throughput zeolite synthesis screening reactions. For the high-throughput zeolite synthesis screening reactions, a 30 wt. % aqueous silica suspension (LUDOX LS-30 or AERO-DISP W7330 N) was combined in a 0.5 mL well with 3.47 wt. % aqueous boric acid solution, an aqueous base solution (5 wt. % LiOH, 10 wt. % NaOH, or 17.5 wt. % KOH), and the aqueous solution of the directing agent. Particular pre-synthesis ratios of the reactants and the reaction times for various samples are specified in Table 1 below. Exceptions to the general conditions are also noted in Table 1. Heating was conducted at 160° C. under sealed conditions for to the reaction times indicated in Table 1. HCl was introduced after all other reagents had been added to adjust OH:Si ratio.

TABLE 1

| Sample No. | Silica Source[a,b] | Si:B (atomic) | MOH:Si (atomic) | SDA:Si (atomic) | H$_2$O:Si (atomic) | HCl:Si (atomic) | Reaction Time (days) | Result |
|---|---|---|---|---|---|---|---|---|
| 1 | L | 20 | Na, 0.30 | 0.30 | 70 | 0 | 4 | UTD-1 |
| 2 | A | 40 | Li, 0.30 | 0.30 | 70 | 0 | 7 | UTD-1 |
| 3 | L | 40 | Li, 0.30 | 0.30 | 70 | 0.3 | 7 | UTD-1 |
| 4 | A | 20 | Na, 0.10 | 0.20 | 49 | 0 | 7 | UTD-1 |
| 5 | L | 20 | Li, 0.30 | 0.30 | 74 | 0.3 | 7 | UTD-1 |
| 6 | L | 10 | Na, 0.10 | 0.30 | 71 | 0 | 7 | UTD-1 (broad) |
| 7 | L | 5 | Na, 0.10 | 0.30 | 80 | 0 | 7 | UTD-1 (broad) |
| 8 | A | 40 | Na, 0.10 | 0.20 | 47 | 0 | 28 | UTD-1 |
| 9 | A | 20 | Li, 0.10 | 0.20 | 50 | 0 | 28 | UTD-1 |
| 10 | L | 10 | K, 0.10 | 0.20 | 53 | 0 | 28 | UTD-1 |
| 11 | A | 20 | K, 0.10 | 0.20 | 49 | 0 | 28 | UTD-1 |
| 12[c] | L | undef. | 0 | 0.30 | 59 | 0 | 28 | UTD-1 |
| 13 | L | 5 | Na, 0.10 | 0.30 | 80 | 0 | 28 | UTD-1 |
| 14 | A | 40 | Li, 0.10 | 0.20 | 47 | 0 | 28 | UTD-1, crist. |
| 15[d] | L | 5 | 0 | 0.30 | 60 | 0 | 28 | UTD-1, quartz |
| 16 | A | 40 | Na, 0.10 | 0.20 | 47 | 0 | 28 | UTD-1, quartz |

[a]L = LUDOX LS-30
[b]A = ACRODISP W 7330 N
[c]Si:Al = 40 (atomic). No boron was present. The Al source was MS-25 silica-alumina (65.5% silica-22% alumina).
[d]Si:Ti = 40 (atomic). The Ti source was solid titanium dioxide.
crist. = cristobalite The characterization results in Table 1 are based upon analysis of the powder x-ray diffraction (XRD) pattern of the product in comparison to UTD-1. Characteristic x-ray powder diffraction peaks for UTD-1 may be found in U.S. Pat. No. 6,103,215, which is incorporated herein by reference. The powder x-ray diffraction peaks are within experimental error for the powder x-ray diffraction peaks for the borosilicate and aluminosilicate forms of UTD-1 noted above. Table 2 shows the characteristic powder XRD 2θ diffraction angles of calcined UTD-1 synthesized using cobalticinium as a directing agent. For the screening samples, characteristic powder x-ray diffraction peaks were determined using CuK-α radiation and a Bruker DaVinci D8 Discovery powder x-ray diffractometer operating in continuous mode with a Bragg-Bentano geometry and a Vantec 500 detector. The angle range was 4-28°.

TABLE 2

| 2θ (degrees) | d spacing |
| --- | --- |
| 6.0 ± 0.1 | 14.4-15.0 |
| 7.6 ± 0.1 | 11.5-11.8 |
| 14.55 ± 0.15 | 6.0-6.1 |
| 19.8 ± 0.1 | 4.4-4.58 |
| 21.2 ± 0.1 | 4.17-4.21 |
| 22.0 ± 0.1 | 4.01-4.06 |
| 22.5 ± 0.1 | 3.92-3.96 |
| 24.5 ± 0.05 | 3.64-3.68 |

Powder x-ray diffraction analyses of the scaleup samples below were conducted using a Brucker D4 powder x-ray diffractometer operating in continuous mode with Cu Kα radiation and a step size of 0.01796°. The detector was a Vantec-1 gaseous detector with a 50 mm×16 mm active area.

Example 3

Scaleup of Sample 12 (Direct Aluminosilicate Synthesis)

A larger scale synthesis of Sample 12 from Example 2 was conducted using a 23 mL Teflon-coated liner for a Parr autoclave vessel. To the liner were added 9.00 g of a 10 wt. % aqueous solution of the DA, 2.24 g deionized water, 3.28 g of LS-30, and 0.104 g of MS-25 silica-alumina mixture (65.5% silica-22% alumina), along with a small amount of seeds obtained from Sample 12 of Example 2. The liner was capped and sealed within a 23 mL Parr autoclave vessel. The autoclave vessel was then heated in a convection oven under tumbling conditions for 9 days at 160° C. The autoclave vessel was then removed from the oven and quenched by placing the autoclave vessel in a water bath to promote cooling. The product was isolated by filtration, washed with about 250 mL of deionized water, and then dried in an oven at 95° C. A portion of the sample was then calcined.

Calcination was conducted in a box furnace using a staged procedure. The sample was exposed to flowing nitrogen for two hours at room temperature, followed by a ramp from room temperature to 400° C. over a two-hour period while the sample remained under nitrogen flow. The temperature then maintained at 400° C. for 15 minutes, and the atmosphere was switched from flowing nitrogen to flowing dried air. The temperature was then ramped from 400° C. to 600° C. over one hour. The temperature maintained at 600° C. for 16 hours, and the box furnace was then allowed to cool.

Figure 2:
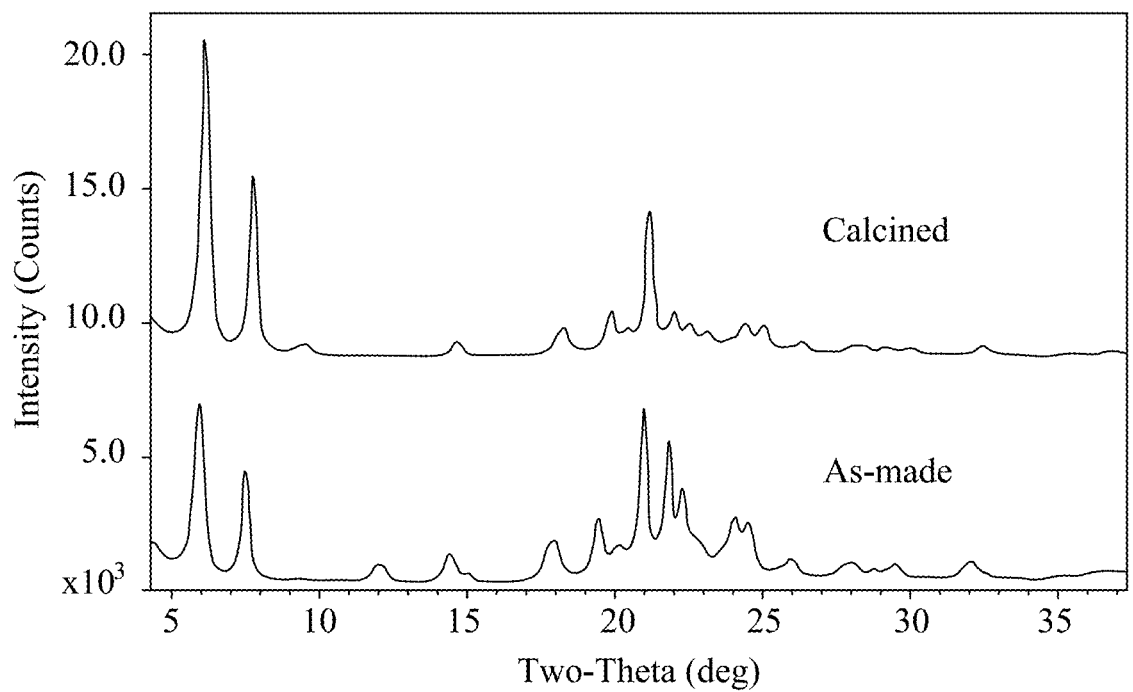
FIG. 2 shows comparative powder XRD patterns for Sample 12 pre-calcination (as-made) and post-calcination.
Figure 3A:
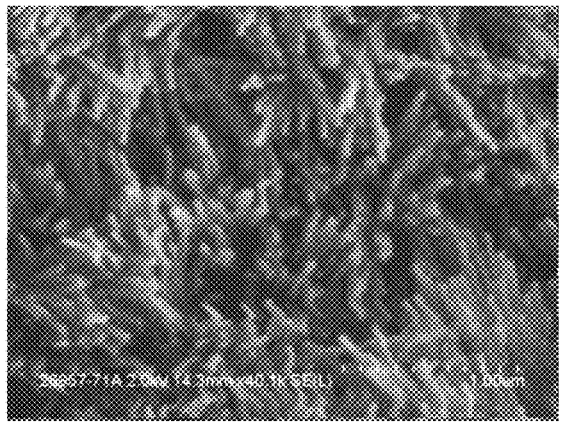
FIGS. 3A-3D show illustrative SEM images of Sample 12 pre-calcination at various magnifications.
Figure 3B:
Figure 3C:
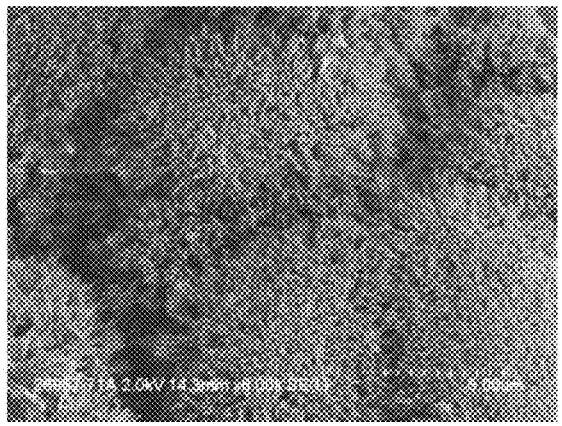
Figure 3D:
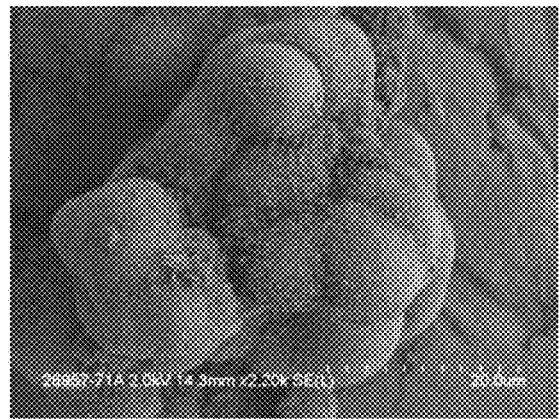

FIG. 2 shows comparative powder XRD patterns for Sample 12 pre-calcination (as-made) and post-calcination. As shown, the powder XRD patterns were substantially similar to one another, indicating that the framework silicate of the zeolite does not change under the calcination conditions. The power XRD patterns substantially matched those of an authentic UTD-1 sample.

FIGS. 3A-3D show illustrative SEM images of Sample 12 pre-calcination at various magnifications. As shown, the UTD-1 produced in Sample 12 was in the form of bundles of needles or laths approximately 0.25-0.50 microns in length.

Thermogravimetric analysis of the pre-calcination product heated in air showed a 15.7% mass loss after heating beyond 200° C.

Example 4

Additional Scaleup of Sample 12 (Direct Aluminosilicate Synthesis)

Sample 12 was synthesized on an even larger scale as follows using seed crystal from Example 3. To a 125 mL Teflon liner were added 36.0 g of aqueous 10.5 wt. % DA solution, 8.96 g of deionized water, 13.12 g of LS-30, 0.416 g MS-25 silica-alumina (65.5% silica-22% alumina), and 0.012 g of seed crystals (Example 3). The liner was then capped and sealed within a 125 mL Parr autoclave vessel. The autoclave vessel was then heated in a convection oven under tumbling conditions for 10 days at 160° C. The product was isolated by filtration, washed with about 250 mL of deionized water, and then dried in an oven at 95° C. to yield 4.4 g of dry product. The product was then calcined. Powder XRD (not shown) indicated that the post-calcination product was UTD-1. The measured alpha value for the calcined zeolite showed a catalytic activity was 110.

Example 5

Modified Sample 12 (Direct Aluminosilicate Synthesis)

Sample 12 was resynthesized under modified conditions on a 23 mL scale with a Si:Al atomic ratio of 25 and a Na:Si atomic ratio of 0.05 as follows. To a 23-mL Teflon liner were added 9 g of aqueous 10.5 wt. % DA solution, 2.02 g of LS-30, 0.104 g of MS-25 silica-alumina (65.5% silica-22% alumina), 0.56 g of aqueous 1 M NaOH, and about 0.01 g of seed crystals (Example 3). The liner was then capped and sealed within a 23 mL Parr autoclave vessel. The autoclave vessel was then heated in a convection oven under tumbling conditions for 7 days at 160° C. The product was isolated by filtration, washed with about 200 mL of deionized water, and then dried in an oven at 95° C. to yield 0.81 g of dry product. Powder XRD (not shown) indicated that the product was UTD-1. The product was not calcined in this instance.

Figure 4:
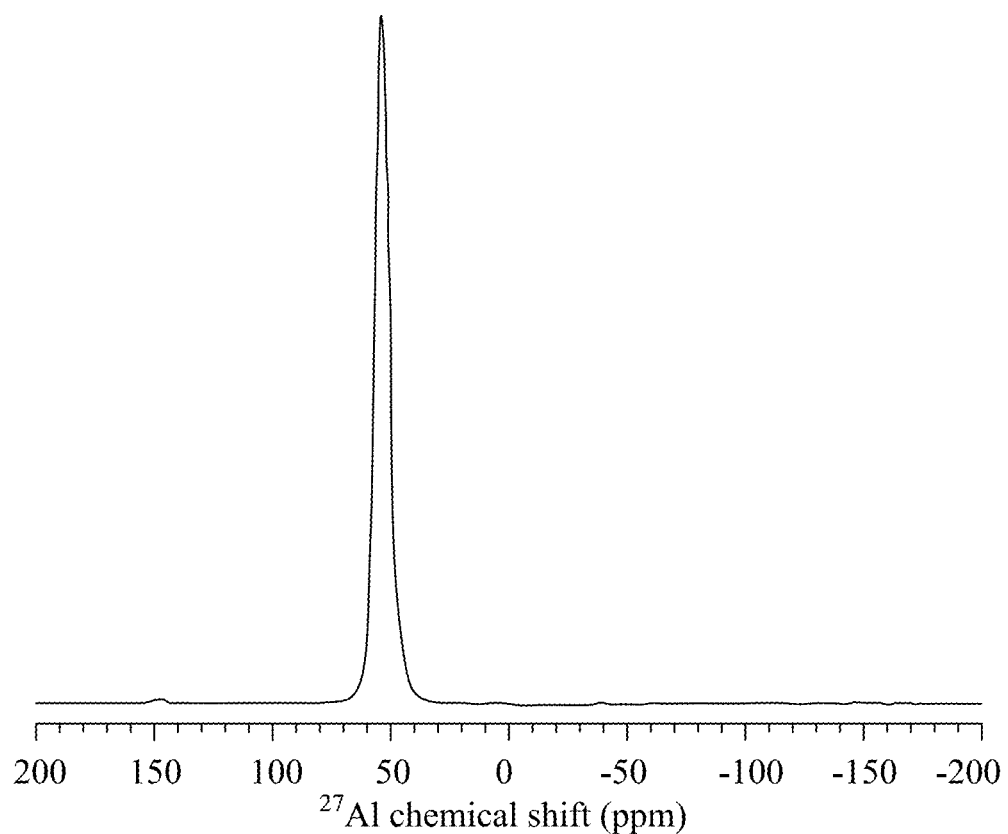
FIG. 4 shows an illustrative $^{27}Al$ NMR of modified Sample 12 from Example 5.

Elemental analyses of the product by ICP showed a Si:Al atomic ratio of 29, which indicates that most of the available aluminum from the reactants was incorporated into the framework silicate of the zeolite. FIG. 4 shows an illustrative $^{27}Al$ NMR of modified Sample 12 from Example 5. The chemical shift from the $^{27}Al$ NMR is characteristic of aluminum having tetrahedral coordination. Comparison of the $^{27}Al$ NMR signal intensity against an aluminum standard indicated that the sample contained 1.63 wt. % Al. Taking the calculated amount of Al in combination with the amount of occluded organics from the directing agent (18 wt. %) and extra-framwork water, a calculated ratio of Si:Al was obtained, which is inconsistent with the ICP ratio.

Example 6

Borosilicate Synthesis Scaleup

A borosilicate sample having a Si:B atomic ratio of 24 in the reactants was synthesized as follows. To a 23 mL Teflon liner were added 3.08 g of aqueous DA solution (1.82 mmol), 0.72 g of aqueous 1 MNOH, 4.53 g of deionized water, and 0.036 g of sodium tetraborate decahydrate. There-after, 0.54 g of CABOSIL fumed silica (Cabot Corp.) and a small quantity of seeds from Sample 12 of Example 2 were added. The liner was then capped and sealed within a 23 mL Parr autoclave vessel. The autoclave vessel was then heated in a convection oven under tumbling conditions for 7 days at 160° C. The autoclave vessel was then removed from the oven and quenched as above. The product was isolated by filtration, washed with about 250 mL of deionized water, and then dried in an oven at 95° C. Powder XRD (not shown) indicated that the product was UTD-1. The product was not calcined in this instance.

Elemental analyses of the product by ICP indicated a Si:B atomic ratio of 23, which indicates that the silicon and boron combined in largely the same ratio that these elements were present in the reactants. This result suggests that there is a particular driving force for incorporating trivalent atoms using the directing agent disclosed herein. Usually high solubility of boron precludes full incorporation of boron atoms from the reaction mixture.

Example 7

Aluminum Exchange Reaction for the Borosilicate of Example 6

0.2 g of as-made UTD-1 from Example 6 was combined with 15 mL of aqueous 1 M $AlCl_3$ solution within a 23 mL Teflon liner. The liner was then capped and sealed within a 23 mL Parr autoclave vessel. The autoclave vessel was then heated in a convection oven under tumbling conditions for 3 days at 150° C. The autoclave vessel was then removed from the oven and quenched as above. The product was isolated by filtration, washed with about 150 mL of deionized water, and then dried in an oven at 95° C. Following exchange, EDS electron microprobe analysis showed the pre-calcination product to have a Si:Al atomic ratio of 82.

Example 8

Titanosilicate Sample Scaleup

A titanosilicate sample having a Si:Ti atomic ratio of 40 in the reactants was synthesized as follows. To a 23 mL Teflon liner were added 9 g of aqueous 10.5 wt. % DA solution, 3.28 g of LS-30, 1.44 g of deionized water, and 0.0327 g of titanium dioxide. The $H_2O$:Si atomic ratio was 40 and the Si:Ti atomic ratio was 20. The liner was then capped and sealed within a 23 mL Parr autoclave vessel. The autoclave vessel was then heated in a convection oven under tumbling conditions for 10 days at 160° C. The product was isolated by filtration, washed with about 200 mL of deionized water, and then dried in an oven at 95° C. to yield 0.94 g dry product. Powder XRD (not shown) indicated that the product was UTD-1. Elemental analyses of the pre-calcination product by ICP indicated a Si:Ti atomic ratio of 57. The Si:Ti atomic ratio indicates that approximately 70% of the Ti from the reactants became incorporated within the zeolite framework. The product was not calcined in this instance.

Example 9

All Silica Synthesis

Example 8 was repeated without including the titanium dioxide. After 14 days of heating, a mixture comprising about 60% UTD-1 and amorphous material was obtained. After 21 days of heating, solely UTD-1 was obtained.

Example 10

Modified Aluminosilicate Ratio

Example 3, further modified as follows, was repeated at a Si:Al atomic ratio of 15 and a NaOH:Si atomic ratio of 0.10. To a 23 mL Teflon liner were added 5.13 g of aqueous 10.5 wt. % DA solution, 1.68 g of Ludox LS-30, 0.156 g MS-25 silica-alumina mixture (65.5% silica-22% alumina), 1.01 g 1 M NaOH, and 0.01 g seeds from Example 3. The liner was then capped and sealed within a 23 mL Parr autoclave vessel. The autoclave vessel was then heated in a convection oven under tumbling conditions for 14 days at 160° C. The product was isolated by filtration, washed with about 200 mL of deionized water, and then dried in an oven at 95° C. to yield 0.81 g dry product. Powder XRD (not shown) indicated that the product was UTD-1. $^{27}$Al NMR showed that the aluminum was in a tetrahedral coordination environment. The $H^+$ form exhibited an alpha value of approximately 190.

Example 11

Borosilicate Gel

Example 6 was modified with gel formation and a SDA:Si ratio of 0.3, a Si:B ratio of 5, a NaOH:Si ratio of 0.1, and a water:Si ratio of 30. To a 45 mL Teflon liner were added 10.11 g of aqueous 10.5 wt. % DA solution (0.54 mmol/g), 0.225 g boric acid, 1.812 g 1 M NaOH, 3.63 g Ludox LS-30, and 0.01 g seeds from Example 6. The liner was then capped and sealed within a 45 mL Parr autoclave vessel. The autoclave vessel was then heated in a convection oven under tumbling conditions for 7 days at 160° C. The product was isolated by filtration, washed with deionized water, and then dried in an oven at 95° C. to yield 0.81 g dry product. Powder XRD (not shown) indicated that the product was UTD-1.

A five-fold increase in scale using a 100 mL Parr autoclave vessel also afforded UTD-1 after 10 days of heating under tumbling conditions for 10 days at 160° C. Elemental analyses by ICP indicates a Si:B atomic ratio of 16.4. CHN combustion analysis of the as-made product indicates 11.43% C, 2.70% N, and 1.30% H.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

One or more illustrative embodiments are presented herein. Not all features of a physical implementation are described or shown in this application for the sake of clarity. It is understood that in the development of a physical embodiment of the present disclosure, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for one of ordinary skill in the art and having benefit of this disclosure.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

The invention claimed is:

1. A zeolite synthesis process comprising:
   combining at least a silicon atom source and a directing agent having a structure of

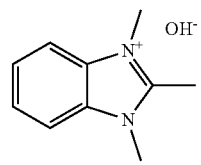

in an aqueous medium;
   forming a zeolite in the aqueous medium under hydrothermal synthesis conditions, the zeolite having a framework silicate with a cationic portion of the directing agent occluded within pores or channels of the framework silicate;
   wherein the zeolite has a powder x-ray diffraction pattern with at least the following 2θ scattering angles:
   6.0±0.12, 7.6±0.1, 14.66±0.15, 19.7±0.15, 21.27±0.15, 22.13±0.15, 22.61±0.15, and 24.42±0.10 for a borosilicate form zeolite, or
   6.0±0.12, 7.6±0.15, 14.55±0.15, 19.64±0.15, 21.01±0.20, 21.90±0.20, 22.34±0.20, and 24.38±0.20 for an aluminosilicate form zeolite; and
   isolating the zeolite from the aqueous medium.

2. The zeolite synthesis process of claim 1, further comprising:
   calcining the zeolite in air or oxygen to form a calcined zeolite that is free of the directing agent.

3. The zeolite synthesis process of claim 1, wherein the silicon atom source comprises a silica.

4. The zeolite synthesis process of claim 1, further comprising:
   combining at least one of a trivalent atom source or a tetravalent atom source with the silicon atom source and the directing agent in the aqueous medium.

5. The zeolite synthesis process of claim 4, wherein the framework silicate of the zeolite incorporates aluminum atoms.

6. The zeolite synthesis process of claim 4, wherein the trivalent atom source comprises an alumina.

7. The zeolite synthesis process of claim 4, wherein the zeolite has a Si:Al atomic ratio of about 100:1 to about 10:1.

8. The zeolite synthesis process of claim 4, wherein the framework silicate of the zeolite incorporates titanium atoms.

9. The zeolite synthesis process of claim 4, wherein the tetravalent atom source comprises titanium dioxide.

10. The zeolite synthesis process of claim 4, wherein the zeolite has a Si:Ti atomic ratio of about 100:1 to about 30:1.

11. The zeolite synthesis process of claim 4, wherein the framework silicate of the zeolite incorporates boron atoms.

12. The zeolite synthesis process of claim 11, further comprising:
   exposing the zeolite to an aqueous solution comprising an aluminum salt; and
   exchanging at least a portion of the boron atoms incorporated in the framework silicate with aluminum atoms from the aluminum salt.

13. The zeolite synthesis process of claim 4, wherein the trivalent atom source comprises sodium tetraborate or boric acid.

14. The zeolite synthesis process of claim 4, wherein the zeolite has a Si:B atomic ratio of about 100:1 to about 5:1.

15. The zeolite synthesis process of claim 1, wherein the hydrothermal synthesis conditions comprise heating the aqueous medium in a sealed container above the boiling point of water.

16. The zeolite synthesis process of claim 1, wherein the hydrothermal synthesis conditions comprise heating the aqueous medium in a sealed container at a temperature of at least about 150° C. for a period of time ranging from about 4 days to about 30 days.

17. The zeolite synthesis process of claim 1, wherein the aqueous medium further comprises an alkali metal base.

18. The zeolite synthesis process of claim 17, wherein the alkali metal base is selected from the group consisting of lithium hydroxide, sodium hydroxide, potassium hydroxide, and any combination thereof.

19. The zeolite synthesis process of claim 1, wherein an atomic ratio of the directing agent to silicon in the aqueous medium ranges from about 0.2:1 to about 0.4:1.

20. A zeolite comprising:
a framework silicate having a plurality of pores or channels defined therein; and
a cationic portion of a directing agent having a structure of

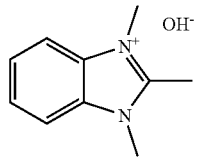

occluded within the pores or channels;
wherein the zeolite has a powder x-ray diffraction pattern with at least the following 2θ scattering angles:
0±0.12, 7.6±0.1, 14.66±0.15, 19.7±0.15, 21.27±0.15, 22.13±0.15, 22.61±0.15, and 24.42±0.10 for a borosilicate form zeolite, or
0±0.12, 7.6±0.15, 14.55±0.15, 19.64±0.15, 21.01±0.20, 21.90±0.20, 22.34±0.20, and 24.38±0.20 for an aluminosilicate form zeolite.

21. The zeolite of claim 20, wherein the framework silicate incorporates aluminum atoms, and the zeolite has a Si:Al atomic ratio of about 100:1 to about 10:1.

22. The zeolite of claim 20, wherein the framework silicate incorporates titanium atoms, and the zeolite has a Si:Ti atomic ratio of about 100:1 to about 30:1.

23. The zeolite of claim 20, wherein the framework silicate incorporates boron atoms, and the zeolite has a Si:B atomic ratio of about 100:1 to about 5:1.

24. A zeolite comprising:
a framework silicate having a plurality of pores or channels defined therein;
wherein the zeolite has a powder x-ray diffraction pattern with at least the following 2θ scattering angles: 6.0±0.12, 7.6±0.15, 14.55±0.15, 19.64±0.15, 21.01±0.20, 21.90±0.20, 22.34±0.20, and 24.38±0.20; and
wherein aluminum atoms are incorporated in the framework silicate and the zeolite has a Si:Al atomic ratio of about 15:1 or lower.

25. The zeolite of claim 24, wherein the Si:Al atomic ratio is about 15:1 to about 10:1.

26. The zeolite of claim 24, further comprising:
a cationic portion of a directing agent having a structure of

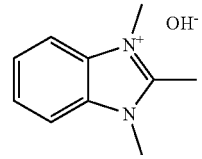

occluded within the pores or channels.

* * * * *